(12) United States Patent
Scholzen et al.

(10) Patent No.: US 9,709,272 B2
(45) Date of Patent: Jul. 18, 2017

(54) PRESSURE-MEASURING GLOW PLUG

(71) Applicant: Robert Bosch GmbH, Stuttgart (DE)

(72) Inventors: Holger Scholzen, Stuttgart (DE);
Janpeter Wolff, Wurmberg (DE);
Wolfgang Koetzle, Ehningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 106 days.

(21) Appl. No.: 14/364,256

(22) PCT Filed: Dec. 10, 2012

(86) PCT No.: PCT/EP2012/074932
§ 371 (c)(1),
(2) Date: Jun. 10, 2014

(87) PCT Pub. No.: WO2013/087564
PCT Pub. Date: Jun. 20, 2013

(65) Prior Publication Data
US 2015/0040651 A1    Feb. 12, 2015

(30) Foreign Application Priority Data
Dec. 14, 2011  (DE) .................. 10 2011 088 468

(51) Int. Cl.
*G01M 15/04* (2006.01)
*F23Q 7/00* (2006.01)
(52) U.S. Cl.
CPC ........... *F23Q 7/001* (2013.01); *G01M 15/042* (2013.01); *F23Q 2007/002* (2013.01)
(58) Field of Classification Search
CPC ............... F23Q 2007/002; F23Q 7/001; F23Q 2007/005; F02P 19/028; G01M 15/042; G01M 15/09
See application file for complete search history.

(56) References Cited

U.S. PATENT DOCUMENTS 6,487,898 B1 * 12/2002 Haefner ................. G01L 23/18
                                                    73/114.18
6,575,039 B2 * 6/2003 Murai .................... G01L 23/10
                                                    73/114.21
(Continued)

FOREIGN PATENT DOCUMENTS

CN         1734076 A      2/2006
CN       101166960 A      4/2008
(Continued)

OTHER PUBLICATIONS

International Search Report for PCT/EP2012/074932, dated Mar. 6, 2013.

*Primary Examiner* — Freddie Kirkland, III
(74) *Attorney, Agent, or Firm* — Norton Rose Fulbright US LLP; Gerard Messina

(57) ABSTRACT

A pressure-measuring glow plug has a heating pin for igniting a combustion mixture of an internal combustion engine and a pressure sensor for detecting a combustion chamber pressure of the internal combustion engine. The pressure-measuring glow plug has a contacting unit which includes a carrier for accommodating a signal processing unit and a plug connection having connecting contacts in a plug housing. A glow module housing for accommodating the heating pin and the pressure sensor and an electronic module housing for accommodating the carrier are provided. The electronic module housing is connected at a glow module-sided connecting location to the glow module housing and, at a plug-sided connecting location, to the plug housing.

21 Claims, 3 Drawing Sheets

(56) References Cited

U.S. PATENT DOCUMENTS

| | | | |
|---|---|---|---|
| 6,799,451 B2 | 10/2004 | Kiess et al. | |
| 7,159,448 B2 * | 1/2007 | Moelkner | G01L 23/18 73/114.18 |
| 7,193,183 B2 * | 3/2007 | Haussner | G01L 23/22 219/267 |
| 7,635,826 B2 * | 12/2009 | Yamada | F23Q 7/001 219/260 |
| 7,726,269 B2 | 6/2010 | Ramond et al. | |
| 7,775,187 B2 | 8/2010 | Boucard et al. | |
| 8,297,115 B2 * | 10/2012 | Borgers | G01L 23/18 73/114.19 |
| 8,519,306 B2 * | 8/2013 | Itoh | F23Q 7/001 123/143 R |
| 8,671,742 B2 * | 3/2014 | Ramond | F23Q 7/001 73/114.18 |
| 8,857,249 B2 * | 10/2014 | Pottiez | G01L 23/24 73/114.18 |
| 9,151,499 B2 * | 10/2015 | Ratosa | F23Q 7/001 |
| 9,249,975 B2 * | 2/2016 | Ratosa | G01L 23/222 |
| 2002/0121127 A1 | 9/2002 | Kiess et al. | |
| 2005/0150301 A1 * | 7/2005 | Skinner | F02P 19/028 73/714 |
| 2008/0216786 A1 * | 9/2008 | Ramond | G01L 23/22 123/143 A |
| 2009/0320576 A1 * | 12/2009 | Borgers | G01L 23/18 73/114.18 |
| 2014/0352640 A1 * | 12/2014 | Okinaka | F02P 19/028 123/145 A |
| 2015/0013633 A1 * | 1/2015 | Wolff | F23Q 7/001 123/145 A |

FOREIGN PATENT DOCUMENTS

| | | |
|---|---|---|
| CN | 101614609 A | 12/2009 |
| DE | 10 2004 0438 | 3/2005 |
| DE | 103 46 330 | 5/2005 |
| EP | 1 637806 | 3/2006 |
| EP | 2 138 819 | 12/2009 |
| JP | 2002-327919 A | 11/2002 |
| JP | 2006 010306 | 1/2006 |
| JP | 2008-536084 A | 9/2008 |
| JP | 2009 063256 | 3/2009 |
| JP | 2009 22 90 3 | 10/2009 |
| JP | 2010 133603 | 6/2010 |
| JP | 2010-139151 A | 6/2010 |

* cited by examiner

PRESSURE-MEASURING GLOW PLUG

BACKGROUND OF THE INVENTION

1. Field of the Invention

The present invention relates to a pressure-measuring glow plug for use in a cylinder head of an internal combustion engine according to the definition of the species in Claim 1.

2. Description of the Related Art

A pressure-measuring glow plug is known from published European patent application document EP 1 637806 A2, having a glow module and an electronic module, the glow module including the components of a glow plug and the electronic module including a sensor unit having a pressure sensor and a plug housing for contacting a connecting plug. The glow module is surrounded by a massive glow plug housing, which is connected to an electronic module housing. The electronic module housing encloses the sensor unit and partially the plug housing. The sensor unit and the plug housing are two separate components, separated from each other.

From published Japanese patent application document JP 2009 22 90 39 A1, a pressure-measuring glow plug is known having a glow plug housing, in addition, a signal processing unit for preprocessing the signals of a sensor unit being integrated into the pressure-measuring glow plug. In this context, the glow plug housing accommodates a heating pin, the sensor unit and the signal processing unit. On the glow plug housing, on the combustion chamber side, an additional protective housing is mounted, which is fastened via a diaphragm and connected to the glow plug body. The electrical plug connection adjoins the glow plug housing on the connecting side.

BRIEF SUMMARY OF THE INVENTION

The present invention has the advantage that the pressure-measuring glow plug is able to be developed in modular form. Because of that, the glow module and the electronic module are able to be manufactured as premountable components which, before the assembly of the glow module housing and the electronic module housing require electrical contacting of the glow module and the contacting module at only one place.

For the purpose of carrying out the connection of the electronic module housing, the electronic module housing has a connecting place on the glow module side and a connecting place on the plug side, the electronic module housing being connected with the glow module side connecting place to the glow module housing and with the plug-sided connecting place to the plug housing.

Between the glow module housing and the electronic module housing an interface is developed, at which at least at a glow module-sided end face of the contacting unit, exposed glow module-sided contacts for contacting the glow module, particularly for contacting the sensor unit are developed. A further simplification is achieved when the interface additionally on the glow module-sided end face of the contacting unit has an exposed high current contact for contacting the connecting bolt of the glow module. To simplify the assembly of the electronic module and the glow module, the exposed sensor-sided contacts and/or the high current contact, in the non-built up state of the pressure-measuring glow plug, project on the glow module-sided end face out from the electronic module housing, so that the exposed sensor-sided contacts and/or the high current contact are freely accessible.

For locking the electronic module housing, the electronic module housing is made with at least one carrier-sided support section and at least one plug-sided support section, the electronic module housing being supported using the carrier-sided support section on at least one carrier-sided carrier section and, using the plug-sided support section, on at least one plug-sided carrier section, or being guided at that place. To do this, furthermore, at the plug-sided carrier section, a sealing ring and a weldable, metallic retaining ring are situated, the electronic module housing, using the plug-sided support section, enclosing in a sealing manner the plug-sided carrier section at least at the sealing ring and being fastened at the retaining ring. In this context, it is expedient if the carrier-sided support section forms at least one first cylindrical section having at least one first inside diameter, and the plug-sided support section forms at least one second cylindrical section having at least one second inside diameter, and if the inside diameter of the plug-sided carrier section is greater than the inside diameter of the carrier-sided support section.

In order to avoid borings that are too long in the manufacturing of the electronic module housing, the electronic module housing is composed of at least two housing parts, the first housing part forming the first sensor-sided support section having at least the first inside diameter and the second housing part forming the plug-sided support section having at least the second inside diameter.

DETAILED DESCRIPTION OF THE INVENTION

Figure 1:
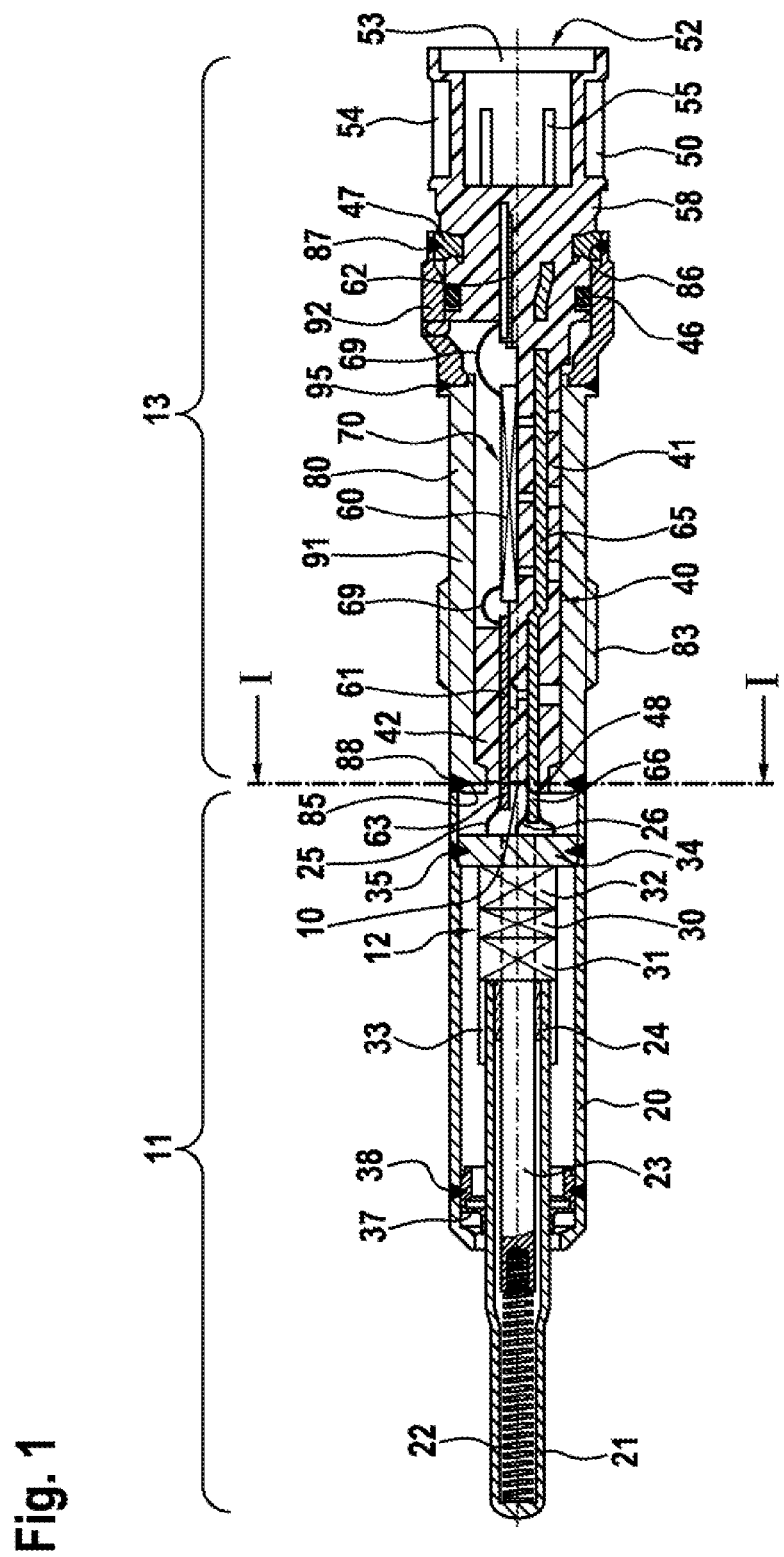
FIG. 1 shows a sectional representation through a pressure-measuring device according to the present invention, in the development of a pressure-measuring glow plug.

The pressure-measuring glow plug shown in FIG. 1 unifies a conventional glow plug for use in a self-igniting internal combustion engine with an additional pressure-measuring function of a pressure-measuring device for detecting a combustion chamber pressure of the internal combustion engine. The pressure-measuring glow plug includes essentially a glow module 11 and an electronic module 13, which are accommodated at least partially in a housing. The housing includes at least one glow module housing 20, an electronic module housing 80 and a plug housing 50.

Glow module 11 includes the actual components of a glow plug and a sensor unit 12 for pressure measurement. Glow module 11 includes a heating pin 21 that is set into a glow module housing 20, heating pin 21 standing out from glow module housing 20 and extending with the part standing out into the combustion chamber of the internal combustion engine, and thereby forms the pressure sensor. In the present specific embodiment, heating pin 21 is a metallic glow pipe, in which a heater coil 22 is situated, which is contacted with the glow pipe and a connecting bolt 23.

Between the glow pipe and connecting bolt 23, an electrically insulated sealing element 24 is also situated. It is also possible, however, to make heating pin 21 as a ceramic heating element.

Sensor unit 12 is accommodated within glow module housing 20 and has, for instance, a piezoelectric pressure sensor 30, a glow pipe-sided pressure piece 31 and a fixing element-sided pressure piece 32, pressure sensor 30 being positioned between glow pipe-sided pressure piece 31 and fixing element-sided pressure piece 32. Sensor unit 12 further includes a sleeve-shaped transmitting element 33 and a fixing element 34. Sleeve-shaped transmitting element 33 is connected firmly to glow pipe 21 about the opening and presses with an end face on glow pipe-sided pressure piece 31, so that transmitting element 33 transmits the pressure acting upon glow pipe 21 in the combustion chamber onto pressure sensor 30. To develop a fixed thrust bearing for pressure sensor 30 on glow module housing 20, fixing element 34 is fastened, for example, using an encircling first welding seam 35. To carry out an axial motion as a result of the pressure acting on heating pin 21, heating pin 21 is connected, using a flexible diaphragm, to glow module housing 20, for instance, using an encircling second welding seam 38.

Figure 2:
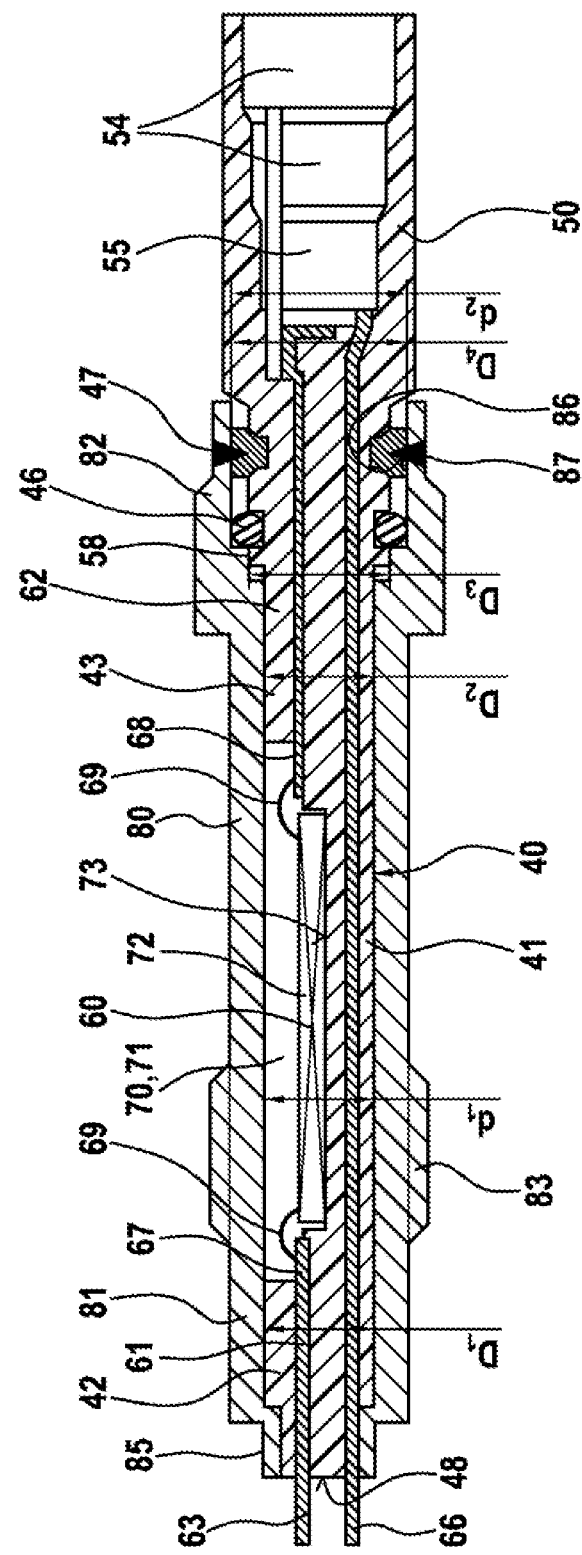
FIG. 2 shows a sectional representation of a contacting module of the pressure-measuring glow plug of FIG. 1, according to a first specific embodiment.
Figure 3:
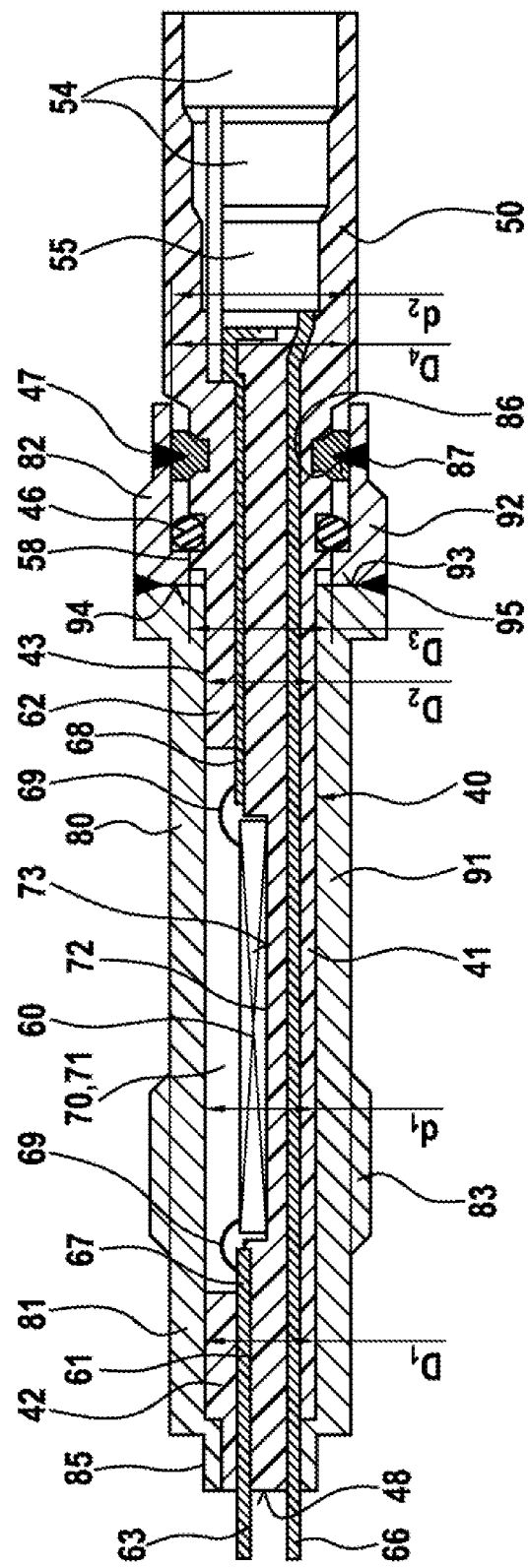
FIG. 3 shows a sectional representation of a contacting module of the pressure-measuring glow plug of FIG. 1, according to a second specific embodiment.

Electronic module 13 has a contacting unit 40, which is shown in detail in FIGS. 2 and 3. Contacting unit 40 includes a carrier 41 for accommodating a signal processing unit 60 or rather a circuit of signal processing unit 60, such as an ASIC, and an electrical plug connection 52 for contacting a connecting a contact plug that is not shown. Plug connection 52, on plug housing 50, has, for instance, annular connecting contacts 54, and in the center it has a high current contact 55 for contacting the connecting plug.

Carrier 41 and plug housing 50 are made of an electrically insulating material, such as a plastic, carrier 41 being connected in an attached form in an axial extension to plug housing 50. Because of this, contacting unit 40 extends in an axial longitudinal extension of the pressure-measuring device.

From a standpoint of production engineering it is expedient if carrier 41 and plug housing 50 are made of the same electrically insulating material and carrier 41 is an integral component of plug housing 50. Because of that, carrier 41 and plug housing 50 may be made as a one-piece component, for instance, by injection molding. However, it is also conceivable that one might develop carrier 41 and plug housing 50 as separate components, which are connected in a suitable manner at least via electrical connections.

Carrier 41 has an accommodation section 70 for accommodating signal processing unit 60, or rather the circuit of signal processing unit 60. Accommodation section 70, in this context, is a recess 71 applied into the lateral surface of the cylindrical execution of carrier 41, for instance, having an additional depression 72 having an essentially flat bottom surface 73. Recess 71 having bottom surface 73 of depression 72 runs essentially parallel to the axis of the longitudinal extension of carrier 41, in this instance, and runs transversely to the axial longitudinal extension of carrier 41 at the outer periphery of carrier 41. Bottom surface 73 of depression 72 lies, for example, radially at most about in the middle of carrier 41, so that, on the one hand, no excessively great weakening of the cylinder section of carrier 41 is created and, on the other hand, a sufficiently great bottom surface 73 is developed for accommodation section 70 on carrier 41. Signal processing unit 60 is positioned on bottom surface 73, and, in this context, is countersunk in depression 73.

Carrier 41 is shaped essentially cylindrically, and according to FIGS. 2 and 3, for example, it has a first carrier-sided carrier section 42 having a first diameter D1 and, axially distanced from it in the direction of plug housing 50, a second carrier-sided carrier section 43 having a second diameter D2, first diameter D1 and second diameter D2 being of essentially the same size. On plug housing 50, a plug-sided carrier section 58 is developed, having a third diameter D3. On plug-sided carrier section 58, a sealing ring 46 is situated and a weldable, metallic retaining ring 47 having a outside diameter D4, retaining ring 47 being preferably molded into the material of plug housing 50. Third diameter D3 produced at additional plug-sided carrier section 58 and outside diameter D4 of retaining ring 47 are each larger than the two diameters D1 and D2 of carrier-sided carrier section 42 and 43 respectively.

According to FIG. 1, on carrier 41 an interface 10 is also formed for contacting glow module 11. Interface 10 is formed by an exposed glow module-sided contact 63 that is developed at a glow module-sided end face 48 of first carrier-sided carrier section 42, for contacting sensor module 12 and an exposed glow module-sided high current contact 66 for contacting connecting bolt 23, the contacting of sensor unit 12 taking place via an electrical connection 25 and the contacting of connecting bolt 23 via an additional electrical connection 26.

Furthermore, sensor-sided connecting lines 61 and plug-sided connecting lines 62 are integrated into carrier 41 and plug housing 50. Sensor-sided connecting lines 61 lead with one end to exposed sensor-sided contacts 63. The other end of sensor-sided connecting lines 61 is connected to sensor-sided connecting contacts 67 for signal processing unit 60. Plug-sided connecting lines 62 are at one end connected to plug-sided connecting contacts 68 for signal processing unit 60, and further, all the way through plug housing 50, electrically to annular connecting contacts 54 of plug connection 52. The electrical contacting of signal processing unit 60 takes place in each case using electrical connections 69, which are contacted to sensor-sided connecting contacts 67 and plug-sided connecting contacts 68.

Provided with a radial distance from the sensor-sided and plug-sided connecting lines 61, 62, there also runs axially through contacting unit 40 an high current line 65, which on the sensor side leads to exposed high current contact 66. On the plug side, high current line 65 leads all the way through plug housing 50 to high current contact 55 on plug connection 52. Sensor-sided and plug-sided connecting lines 61, 62 and/or high current lines 65 are expediently cast integrally into carrier 41 and plug housing 50. Expediently, sensor contacts 63 present at the glow module-sided end face 48 of carrier 41 are developed of the sensor-sided connecting lines 61 integrated into carrier 41. Accordingly, high current contact 66 that is also present at sensor-sided end face 48 is able to be developed from high current line 65 that is integrated into carrier 41.

Contacting unit 40 is at least partially surrounded by pipe-shaped electronic module housing 80, carrier 41 being completely surrounded by electronic module housing 80 and plug housing 50 being partially so. On electronic module housing 80 there is an outside thread 83 for screwing it into a cylinder head of the internal combustion engine. Electronic module housing 80 may, in this case, be developed in one piece or a plurality of pieces.

Electronic module housing 80 has at least one carrier-sided support section 81 having at least one first cylindrical section having at least one first inside diameter d1 and at least one plug-sided support section 82 having at least one second cylindrical section having at least one second inside diameter d2. Second inside diameter d2 of plug-sided support section 82, in this instance, is greater than first inside diameter d1 of carrier sided support section 81. A cylindrical electronic module housing 80 is created thereby having at least one cylindrical stage. The first inside diameter d1 of carrier-sided support section 81 is at least adapted to diameter D1 of first carrier-sided carrier section 42 and possibly present second carrier-sided carrier section 43. The second inside diameter d2 of plug-sided support section 82 is adapted to diameter D3 of plug-sided carrier section 58 and to diameter D4 of retaining ring 47, in such a way that electronic module housing 80 at least surrounds with its carrier-sided support section 81 at least diameter D1 of first carrier-sided carrier section 42 and the possibly continuingly present second diameter D2 of second carrier section 43 and is supported there or guided there. Second inside diameter d2 of plug-sided support section 82 of electronic module housing 80 is adapted to diameter D3 of plug-sided carrier section 58 and to outside diameter D4 of retaining ring 47, in such a way that the at least one plug-sided inside diameter d2 surrounds plug-sided carrier section 58, and, in this instance, encloses sealing ring 46 and lies against retaining ring 47.

Interface 10 is located in a plane I-I lying at right angles to the axial longitudinal extension of the pressure-measuring glow plug, in which, in the non-inserted state of the pressure-measuring glow plug, the sensor-sided contacts 63 exposed at the glow module-sided end face 48 of carrier 41 are located outside electronic module housing 80, and are consequently freely accessible at electronic module 13. Consequently, at interface 10, the electrical contacting of glow module 11 and sensor unit 12 may take place at premounted electronic module 13.

Electronic module housing 80 has a glow module-sided connecting location 85 and plug-sided connecting location 86. A connection of electronic module housing 80 to plug housing 51 is implemented using plug-sided connecting location 86, in that electronic module housing 80 is fastened at plug-sided connecting location 86 to retaining ring 47, for instance, using an encircling welding seam 87. A further connection of electronic module housing 80 to glow module housing 20 is implemented at glow module-sided connecting location 85, in that glow module housing 20 is fastened at glow module-sided connecting location 85 to electronic module housing 80, for instance, using an additional encircling welding seam 88. Glow module-sided connecting location 88 lies, in this context, at least in the vicinity of plane I-I.

In the specific embodiment according to FIG. 2, electronic module housing 80 is made in one piece of a weldable metallic material. Electronic module housing 80 is pushed over carrier 41, and in the process it is guided with carrier-sided support section 81 on first carrier section 42 and on second carrier section 43 as well as using plug-sided support section 82 on plug-sided carrier section 58. Then, electronic module housing 80 is welded to plug-sided connecting location 86 at retaining ring 47 using welding seam 87. Thereafter, the electrical contacting of exposed sensor-sided contact 63 and of exposed high current contact 66 is carried out via electrical connections 25, 26 using connections of pressure sensor 30 and the connection of connecting bolt 23 of prefabricated glow module 12. Finally, thereafter, glow module housing 20 is welded to electronic module housing 80 on the glow module sided connecting location 85, using welding seam 88.

In the exemplary embodiment according to FIG. 3, which is also shown in FIG. 1, electronic module housing 80 is composed, for reasons from a standpoint of production engineering, of a first housing part 91 and a second housing part 92. For reasons of rigidity, both housing parts 91 and 92 are made of a weldable metal, first housing part 91 having outside thread 83 for screwing into the cylinder head. On first housing part 91, carrier-sided support section 81 having diameter d1 is developed and on second housing part 92, plug-sided support section 82 having diameter d2 is developed. The two housing parts 91 and 92 are connected at a further connecting location 94 using an encircling welding seam 95, for example. The further assembly takes place as in the exemplary embodiment in FIG. 2, in that plug-sided support section 82 on plug-sided carrier section 58 and carrier-sided support section 81 on first carrier-sided support section 81 are guided on first carrier-sided carrier section 42 and on possibly present second carrier-sided carrier section 43. Then, electronic module housing 80 is welded to plug-sided connecting location 86 at retaining ring 47 using welding seam 87. Subsequently, the electrical contacting of exposed sensor-sided contacts 63 and of exposed high current contact 66 is carried out via electrical connections 25, 26 using the connections of pressure sensor 30 and the connection of connecting bold 23 of prefabricated glow module 12. Finally, thereafter, glow module housing 20 is welded to electronic module housing 80 on glow module-sided connecting location 85, using welding seam 88.

What is claimed is:

1. A pressure-measuring glow plug, comprising:
  a glow module, including:
    a heating pin configured to ignite a combustion mixture of an internal combustion engine;
    a pressure sensor configured to detect a combustion chamber pressure of the internal combustion engine; and
    at least one glow module housing accommodating the heating pin and the pressure sensor; and
  an electronic module, including:
    a contacting unit including a carrier for accommodating a signal processing unit, the carrier enclosing a plurality of electrically conductive connecting lines and including a glow module-sided end face facing the glow module, and a plurality of glow module-sided contacts forming an extension of the plurality of electrically conductive connecting lines extending from the end face toward the glow module;
    an electronic module housing accommodating the carrier, the electronic module housing being separate from the glow module housing and having a surface that mates to a surface of the glow module housing, the plurality of glow module-sided contacts extending from the end face of the carrier beyond the electronic module housing;
    a plug connection having connecting contacts; and
    a plug housing for the plug connection;
  wherein the heating pin is exposed to the combustion chamber pressure and transmits the combustion chamber pressure at least indirectly to the pressure sensor.

2. The pressure-measuring glow plug as recited in claim 1, wherein the electronic module housing is connected (i) to the glow module housing via at least one glow module-sided connecting location, and (ii) to the plug housing via at least one plug-sided connecting location.

3. The pressure-measuring glow plug as recited in claim 1, wherein the plurality of contacts extending from the end face include a high current contact.

4. The pressure-measuring glow plug as recited in claim 1, wherein the electronic module housing is supported, via at least one carrier-sided support section, on at least one carrier-sided carrier section of the carrier.

5. The pressure-measuring glow plug as recited in claim 1, wherein the electronic module housing is supported, via at least one plug-sided support section, on at least one plug-sided carrier section of the plug housing.

6. The pressure-measuring glow plug as recited in claim 5, wherein a sealing ring and a weldable retaining ring are situated on the plug-sided carrier section, and wherein the electronic module housing encloses the sealing ring in a sealing manner using the plug-sided support section and is fastened on the retaining ring.

7. The pressure-measuring glow plug as recited in claim 5, wherein the carrier-sided supporting section forms at least one first cylindrical section having at least one first inside diameter d1, the plug-sided support section forms at least one second cylindrical section having at least one second inside diameter d2, and the inside diameter d2 of the plug-sided support section is greater than the inside diameter d1 of the carrier-sided support section.

8. The pressure-measuring glow plug as recited in claim 7, wherein the electronic module housing has at least a first housing part and a second housing part, and wherein the first housing part forms the carrier-sided support section having at least the first inside diameter d1 and the second housing part forms the plug-sided support section having at least the second inside diameter d2.

9. The pressure-measuring glow plug as recited in claim 1, wherein the electrically conductive connecting lines extend from the plurality of contacts at the end face to the plug connection.

10. The pressure-measuring glow plug as recited in claim 1, wherein the plurality of contacts form ends of the plurality of connecting lines enclosed by the carrier.

11. The pressure-measuring glow plug as recited in claim 1, wherein the carrier includes at least one cylindrical section having the end face.

12. The pressure-measuring glow plug as recited in claim 1, wherein the end face is substantially perpendicular to a direction of extension of the plurality of contacts from the end face.

13. The pressure-measuring glow plug as recited in claim 1, wherein the end face is substantially perpendicular to a longitudinal axis of the electronic module.

14. The pressure-measuring glow plug as recited in claim 1, wherein the carrier is formed from an electrically insulating material.

15. The pressure-measuring glow plug as recited in claim 1, wherein the carrier and plug housing are a single integral component.

16. A pressure-measuring glow plug, comprising:
   a glow module including a glow module housing at least partially enclosing a heating pin and a pressure sensor; and
   an electronic module including:
      an electronic module housing at least partially enclosing a contacting unit, the electronic module housing being separate from the glow module housing and having a surface that mates to a surface of the glow module housing,
      the contacting unit including a carrier for accommodating a signal processing unit, the carrier enclosing a plurality of electrically conductive connecting lines and having an end face facing the glow module, and
      a plurality of contacts forming an extension of the plurality of electrically conductive connecting lines extending from the end face toward the glow module housing and beyond the electronic module housing.

17. The pressure-measuring glow plug as recited in claim 16, wherein the electronic module includes a plug housing at least partially enclosing a plug connection.

18. The pressure-measuring glow plug as recited in claim 16, wherein the plurality of contacts extending from the end face include a high current contact.

19. The pressure-measuring glow plug as recited in claim 16, further comprising a sealing ring and a weldable retaining ring situated on a plug-sided section of the carrier.

20. The pressure-measuring glow plug as recited in claim 16, wherein the electrically conductive connecting lines extend from the plurality of contacts at the end face to a plug connection.

21. The pressure-measuring glow plug as recited in claim 16, wherein the end face is substantially perpendicular to a direction of extension of the plurality of contacts from the end face.

* * * * *